US012627476B2

(12) United States Patent
Inamdar et al.

(10) Patent No.: US 12,627,476 B2
(45) Date of Patent: May 12, 2026

(54) END-TO-END ENCRYPTION WITH PER-HOP PATH-SELECTION BASED ON UNIQUE EDGE IDENTITIES FOR SD-WAN AND MULTI-HOP NETWORKS

(71) Applicant: Cisco Technology, Inc., San Jose, CA (US)

(72) Inventors: Amjad Inamdar, Bangalore (IN); Laxmikantha Reddy Ponnuru, San Ramon, CA (US); Syed Arslan Ahmed, Bangalore (IN); Anoop V A, Bangalore (IN); Jai Prakash Agrawal, Bilaspur (IN)

(73) Assignee: Cisco Technology, Inc., San Jose, CA (US)

( * ) Notice: Subject to any disclaimer, the term of this patent is extended or adjusted under 35 U.S.C. 154(b) by 218 days.

(21) Appl. No.: 18/530,132

(22) Filed: Dec. 5, 2023

(65) Prior Publication Data

US 2025/0343677 A1     Nov. 6, 2025

(51) Int. Cl.
| | |
|---|---|
| *H04L 29/06* | (2006.01) |
| *H04L 9/08* | (2006.01) |
| *H04L 9/32* | (2006.01) |

(52) U.S. Cl.
CPC .............. *H04L 9/0827* (2013.01); *H04L 9/32* (2013.01)

(58) Field of Classification Search
None
See application file for complete search history.

(56) References Cited

U.S. PATENT DOCUMENTS

| | | | |
|---|---|---|---|
| 11,750,581 B1 | 9/2023 | Carrel et al. | |
| 2007/0101142 A1* | 5/2007 | Suzuki | H04M 3/16 713/168 |
| 2019/0199636 A1 | 6/2019 | Narayanan | |
| 2020/0177503 A1* | 6/2020 | Hooda | H04L 12/4641 |
| 2023/0030403 A1 | 2/2023 | Jeuk | |
| 2023/0059537 A1 | 2/2023 | Gavand et al. | |
| 2023/0198946 A1 | 6/2023 | Zacks et al. | |
| 2023/0388233 A1* | 11/2023 | Thoria | H04L 45/04 |

OTHER PUBLICATIONS

"Cisco Catalyst SD-WAN Design Guide," Cisco, Aug. 2023, pp. 1-102.
International Search Report and Written Opinion for PCT Application No. PCT/US2024/058349, dated Mar. 31, 2025, 12 pages.

* cited by examiner

*Primary Examiner* — Andrew J Steinle
(74) *Attorney, Agent, or Firm* — Polsinelli P.C.

(57) ABSTRACT

A system and associated methods provide solutions for end-to-end privacy and per-hop routing and policy decision in multi-hop and Software-Defined Wide Area Networks (SD-WANs) by leveraging unique SDWAN edge identities of edge devices. The system enables end-to-end encryption between traffic source and destination sites using IPsec ESP tunnel mode, with System IPs as the outer IP addresses. The system further enables per-hop integrity protection using IPsec AH transport mode, with WAN IPs as the outer IP addresses. By having some information encrypted between a source device and a destination device and other information encapsulated between hops (e.g., between source device and an intermediate device), the system enables route and policy lookup based on destination site System-IP, along with integrity protection based on SLA-class in packet metadata for independent path selection at intermediate hops.

20 Claims, 11 Drawing Sheets

600 (cont'd)

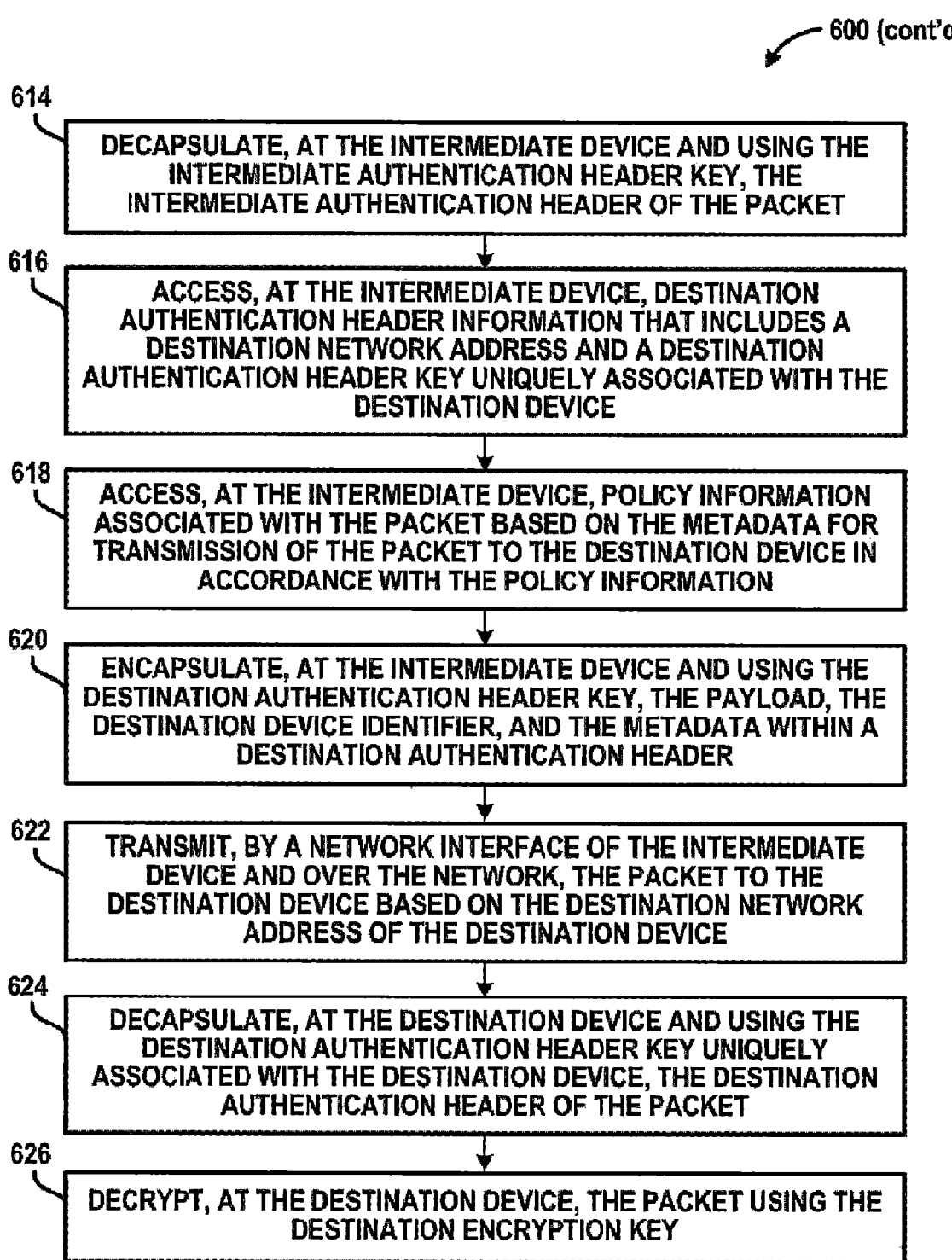

614 — DECAPSULATE, AT THE INTERMEDIATE DEVICE AND USING THE INTERMEDIATE AUTHENTICATION HEADER KEY, THE INTERMEDIATE AUTHENTICATION HEADER OF THE PACKET

616 — ACCESS, AT THE INTERMEDIATE DEVICE, DESTINATION AUTHENTICATION HEADER INFORMATION THAT INCLUDES A DESTINATION NETWORK ADDRESS AND A DESTINATION AUTHENTICATION HEADER KEY UNIQUELY ASSOCIATED WITH THE DESTINATION DEVICE

618 — ACCESS, AT THE INTERMEDIATE DEVICE, POLICY INFORMATION ASSOCIATED WITH THE PACKET BASED ON THE METADATA FOR TRANSMISSION OF THE PACKET TO THE DESTINATION DEVICE IN ACCORDANCE WITH THE POLICY INFORMATION

620 — ENCAPSULATE, AT THE INTERMEDIATE DEVICE AND USING THE DESTINATION AUTHENTICATION HEADER KEY, THE PAYLOAD, THE DESTINATION DEVICE IDENTIFIER, AND THE METADATA WITHIN A DESTINATION AUTHENTICATION HEADER

622 — TRANSMIT, BY A NETWORK INTERFACE OF THE INTERMEDIATE DEVICE AND OVER THE NETWORK, THE PACKET TO THE DESTINATION DEVICE BASED ON THE DESTINATION NETWORK ADDRESS OF THE DESTINATION DEVICE

624 — DECAPSULATE, AT THE DESTINATION DEVICE AND USING THE DESTINATION AUTHENTICATION HEADER KEY UNIQUELY ASSOCIATED WITH THE DESTINATION DEVICE, THE DESTINATION AUTHENTICATION HEADER OF THE PACKET

626 — DECRYPT, AT THE DESTINATION DEVICE, THE PACKET USING THE DESTINATION ENCRYPTION KEY

FIG. 6B

END-TO-END ENCRYPTION WITH PER-HOP PATH-SELECTION BASED ON UNIQUE EDGE IDENTITIES FOR SD-WAN AND MULTI-HOP NETWORKS

BACKGROUND

SD-WAN (Software-Defined Wide Area Network) services are commonly deployed across a plurality of different "branches" of an SD-WAN, where each "branch" can represent a site (e.g., an office) of an interconnected network. Most of the SD-WAN solutions in the market today from different vendors use hub-spoke topologies, that allow for better scalability of the number of sites as well as hierarchical design for global multi-region deployments. However, hub-spoke topology involves per-hop encryption, which incurs overhead and latency with increasing complexity of the SD-WAN and also involves security risks, as customer traffic is exposed at each intermediate hop.

BRIEF DESCRIPTION OF THE SEVERAL VIEWS OF THE DRAWINGS

Details of one or more aspects of the subject matter described in this disclosure are set forth in the accompanying drawings and the description below. However, the accompanying drawings illustrate only some typical aspects of this disclosure and are therefore not to be considered limiting of its scope. Other features, aspects, and advantages will become apparent from the description, the drawings and the claims.

FIGS. 6A and 6B collectively illustrate a method for managing end-to-end encryption with per-hop integrity protection in accordance with some aspects of the present technology.

DESCRIPTION OF EXAMPLE EMBODIMENTS

Figure 1:
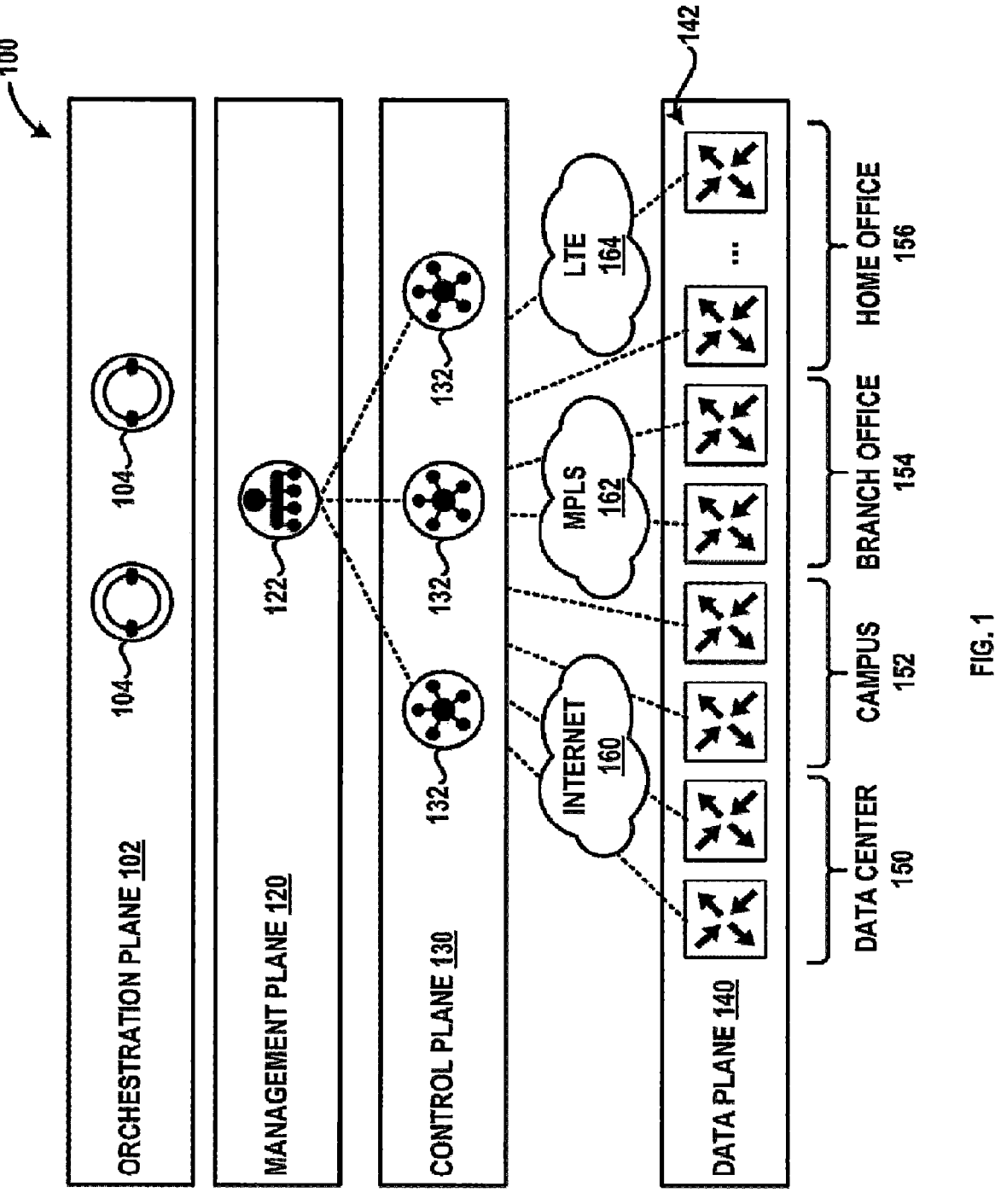
FIG. 1 illustrates an example of a high-level network architecture in accordance with some aspects of the present technology.

The detailed description set forth below is intended as a description of various configurations of embodiments and is not intended to represent the only configurations in which the subject matter of this disclosure can be practiced. The appended drawings are incorporated herein and constitute a part of the detailed description. The detailed description includes specific details for the purpose of providing a more thorough understanding of the subject matter of this disclosure. However, it will be clear and apparent that the subject matter of this disclosure is not limited to the specific details set forth herein and may be practiced without these details. In some instances, structures and components are shown in block diagram form in order to avoid obscuring the concepts of the subject matter of this disclosure.

Overview

Techniques described herein provide procedures for providing end-to-end encryption and per-hop integrity protection in SD-WAN and multi-hop networks, while allowing intermediate devices with pertinent information to make informed routing and policy decisions without sacrificing privacy.

In one aspect, a method for providing end-to-end encryption and per-hop integrity protection in SD-WAN and multi-hop networks includes: encrypting, at a source device of a network and using a destination encryption key, a payload of a packet destined for transmission to a destination device of the network, the destination device being uniquely associated with the destination encryption key and a destination device identifier; encapsulating, at the source device and using an intermediate authentication header key uniquely associated with an intermediate device of the network, the payload, the destination device identifier and metadata within an intermediate authentication header of the packet, the metadata indicating a class of traffic associated with the packet; and transmitting, by a network interface of the source device and over the network, the packet having the intermediate authentication header to the intermediate device.

The method can further include: accessing, at the source device, destination information received from a controller of the network, the destination information including the destination device identifier and the destination encryption key of the destination device.

The method can further include: accessing, at the source device, intermediate authentication header information received from a controller of the network, the intermediate authentication header information including an intermediate network address and the intermediate authentication header key uniquely associated with the intermediate device; and adding, at the source device, routing information to the packet external to the intermediate authentication header, the routing information indicating the intermediate network address of the intermediate device.

The method can further include: decapsulating, at the intermediate device and using the intermediate authentication header key, the intermediate authentication header of the packet; accessing, at the intermediate device, destination authentication header information received from a controller of the network that includes a destination network address and a destination authentication header key uniquely associated with the destination device; encapsulating, at the intermediate device and using the destination authentication header key, the payload, the destination device identifier, and the metadata within a destination authentication header; and transmitting, by a network interface of the intermediate device and over the network, the packet with the destination authentication header to the destination device based on the destination network address of the destination device.

The method can further include: accessing, at the intermediate device, policy information associated with the packet based on the metadata for transmission of the packet to the destination device in accordance with the policy information.

The method can further include: decrypting, at the destination device, the packet using the destination encryption key.

Where the destination device identifier and the metadata are encapsulated within the destination authentication header and the destination device of the network, the method can further include: decapsulating, at the destination device and using a destination authentication header key uniquely associated with the destination device, the destination authentication header of the packet.

The source device can be operable for encrypting the payload using an Internet Protocol Security (IPsec) Encapsulating Security Payload (ESP) protocol. The source device can also be operable for encapsulating the intermediate authentication header using an Internet Protocol Security (IPsec) Authentication Header (AH) protocol.

In some examples, the destination device identifier can be a hash.

In another aspect, a method for providing end-to-end encryption and per-hop integrity protection in SD-WAN and multi-hop networks includes: decapsulating, at an intermediate device of a network and using an intermediate authentication header key uniquely associated with the intermediate device, an intermediate authentication header of a packet received from a source device of the network for transmission to a destination device of the network; identifying, at the intermediate device, the destination device of the network; encapsulating, at the intermediate device and using a destination authentication header key uniquely associated with the destination device, a payload of the packet within a destination authentication header; and transmitting, by a network interface of the intermediate device and over the network, the packet with the destination authentication header to the destination device based on a destination network address of the destination device.

The method can further include: accessing, at the intermediate device and following decapsulation of the intermediate authentication header, a destination device identifier that is uniquely associated with the destination device; and accessing, at the intermediate device, information received from a controller of the network that includes the destination network address and the destination authentication header key uniquely associated with the destination device.

The method can further include: accessing, at the intermediate device, metadata of the packet indicating a class of traffic associated with the packet; and accessing, at the intermediate device, policy information associated with the packet based on the metadata for transmission of the packet to the destination device in accordance with the policy information.

The destination authentication header can encapsulate the payload of the packet, a destination device identifier, and metadata of the packet. The payload can be encrypted by a source device in communication with the intermediate device using a destination encryption key uniquely associated with the destination device. The metadata can indicate a class of traffic associated with the packet. Further, the destination device identifier can be uniquely associated with the destination device.

The method can further include: adding, at the intermediate device, routing information to the packet following encapsulation of the packet within the destination authentication header, the routing information indicating the destination network address of the destination device.

The destination device can be operable for: decapsulating, at the destination device, the destination authentication header of the packet using a destination authentication header key uniquely associated with the destination device; and decrypting, at the destination device, the packet using a destination encryption key uniquely associated with the destination device.

Likewise, the destination device can be operable for decrypting the payload using an Internet Protocol Security (IPsec) Encapsulating Security Payload (ESP) protocol. The intermediate device can be operable for encapsulating the destination authentication header using an Internet Protocol Security (IPsec) Authentication Header (AH) protocol.

In another aspect, a system for providing end-to-end encryption and per-hop integrity protection in SD-WAN and multi-hop networks includes a processor in communication with a memory and a network interface, the memory including instructions executable by the processor to: encrypt, using a destination encryption key, a payload of a packet destined for transmission to a destination device of a network, the destination device being uniquely associated with the destination encryption key and a destination device identifier; encapsulate, using an intermediate authentication header key uniquely associated with an intermediate device of the network, the payload, the destination device identifier and metadata within an intermediate authentication header of the packet, the metadata indicating a class of traffic associated with the packet; and transmit, by the network interface and over the network, the packet having the intermediate authentication header to the intermediate device.

In another aspect, one or more non-transitory computer-readable media includes computer-readable instructions, which when executed by one or more processors of a provider edge device, cause the provider edge device to: encrypt, using a destination encryption key, a payload of a packet destined for transmission to a destination device of a network, the destination device being uniquely associated with the destination encryption key and a destination device identifier; encapsulate, using an intermediate authentication header key uniquely associated with an intermediate device of the network, the payload, the destination device identifier and metadata within an intermediate authentication header of the packet, the metadata indicating a class of traffic associated with the packet; and transmit, by the network interface and over the network, the packet having the intermediate authentication header to the intermediate device.

Example Embodiments

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

The disclosed technology addresses the need in the art for methods to preserve privacy in packets sent from a source device to a destination device within an SD-WAN having a hub-spoke topology, while still allowing intermediate devices to access pertinent information for management and forwarding of the packet in accordance with network policy.

Most SD-WAN solutions currently available from different vendors have hub-spoke topologies that allow for better scalability of a quantity of sites, as well as hierarchical design for global multi-region deployments. In a network having a hub-spoke topology, traffic sent from a first branch (e.g., a first edge device or "source" node) to a second branch (e.g., a second edge device or "destination" node) is often routed through one or more hubs (e.g., intermediate device(s) or "intermediate" node(s)), which can belong to a customer or can be shared by multiple customers.

One problem with hub-spoke topology involves the use of "per-hop encryption" in which an encrypted packet is decrypted and then re-encrypted again at each "hop" between the source device and the destination device. Per-hop encryption incurs encrypt/decrypt overhead at each intermediate hop, introduces latency, and impacts throughput and overall application experience of any multi-hop traffic (such as branch-to-branch traffic and other traffic not terminating on the hub). The greater the quantity of intermediate hops, the greater the impact. One area where this is of particular importance is in hierarchical SD-WAN topologies commonly used to interconnect regional SD-WANs in a global SD-WAN network. This is applicable to Enterprise/customer-owned (e.g., "DIY") SD-WAN deployments as well as "managed" SD-WAN deployments. Further, decryption on the hub under per-hop encryption would expose customer data traffic in cleartext, breaking data privacy which would not be acceptable to many customers and would also have implications on regulatory compliance for customers dealing with sensitive data. This is especially applicable for "SDWAN-as-a-Service" managed SD-WAN deployments with multi-tenant regional/transit hubs.

Another option for maintaining data privacy would be the use of "end-to-end encryption" in which a packet is encrypted at the source and decrypted at the destination. However, for hub-spoke topologies, it is not practical to obfuscate all information from intermediate nodes (e.g., hubs or other intermediate devices). One important challenge with end-to-end encryption involves the inaccessibility of an inner packet (header and payload) at the intermediate nodes for routing and policy decisions. Hence, any solution for end-to-end encryption must also address the problem of path selection and policy adherence at intermediate hops as these are interdependent. Existing methods of end-to-end encryption for hub-spoke topologies use either "source routing" based on label stack/switching (e.g., as in Multiprotocol Label Switching (MPLS)) or "segment routing" for packet forwarding on intermediate hops. These methods require additional protocols or extensions to distribute labels that have associated complexity. Also, these methods employ non-standard Internet Protocol Security (IPsec) encryption that would not be able to leverage off-the-shelf hardware crypto engines or accelerators that perform efficient encryption and IPsec encapsulation.

A computer network is a geographically distributed collection of nodes interconnected by communication links and segments for transporting data between end nodes, such as personal computers and workstations, or other network devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other.

Since management of interconnected computer networks can prove burdensome, smaller groups of computer networks may be maintained as routing domains or autonomous systems. An autonomous system is a network or group of networks under common administration and with common routing policies. A typical example of an autonomous system is a network administered and maintained by an Internet Service Provider (ISP). Customer networks, such as universities or corporations, connect to the ISP, and the ISP routes the network traffic originating from the customer networks to network destinations that may be in the same ISP or may be reachable only through other ISPs.

To facilitate the routing of network traffic through one or more autonomous systems, the network elements of the autonomous systems need to exchange routing information to various network destinations. Border Gateway Protocol (BGP) is an Exterior Gateway Protocol (EGP) that is used to exchange routing information among network elements (e.g., routers) in the same or different autonomous systems. A computer host that executes a BGP process is typically referred to as a BGP host or a BGP network device. To exchange BGP routing information, two BGP hosts, or peers, first establish a transport protocol connection with one another. Initially, the BGP peers exchange messages to open a BGP session, and, after the BGP session is open, the BGP peers exchange their entire routing information. Thereafter, only updates or changes to the routing information are exchanged, or advertised, between the BGP peers. The exchanged routing information is maintained by the BGP peers during the existence of the BGP session.

The networks within an autonomous system are typically coupled together by conventional "intradomain" routers configured to execute intradomain routing protocols, and are generally subject to a common authority. To improve routing scalability, a service provider (e.g., an ISP) may divide an autonomous system into multiple "areas" or "levels." It may be desirable, however, to increase the number of nodes capable of exchanging data; in this case, interdomain routers executing interdomain routing protocols are used to interconnect nodes of the various autonomous systems. Moreover, it may be desirable to interconnect various autonomous systems that operate under different administrative domains. As used herein, an autonomous system, area, or level is generally referred to as a "domain."

FIG. 1 illustrates an example of a network architecture 100 for implementing aspects of the present technology. An example of an implementation of the network architecture 100 is the Cisco® SD-WAN architecture. However, one of ordinary skill in the art will understand that, for the network architecture 100 and any other system discussed in the present disclosure, there can be additional or fewer component in similar or alternative configurations. The illustrations and examples provided in the present disclosure are for conciseness and clarity. Other embodiments may include different numbers and/or types of elements but one of ordinary skill the art will appreciate that such variations do not depart from the scope of the present disclosure.

In this example, the network architecture 100 can comprise an orchestration plane 102, a management plane 120, a control plane 130, and a data plane 140. The orchestration plane can 102 assist in the automatic on-boarding of edge network devices 142 (e.g., switches, routers, etc.) in an overlay network. The orchestration plane 102 can include one or more physical or virtual network orchestrator appliances 104. The network orchestrator appliance(s) 104 can perform the initial authentication of the edge network devices 142 and orchestrate connectivity between devices of the control plane 130 and the data plane 140. In some embodiments, the network orchestrator appliance(s) 104 can also enable communication of devices located behind Network Address Translation (NAT). In some embodiments, physical or virtual Cisco® SD-WAN vBond appliances can operate as the network orchestrator appliance(s) 104.

The management plane 120 can be responsible for the central configuration and monitoring of a network. The management plane 120 can include one or more physical or virtual network management appliances 122. In some embodiments, the network management appliance(s) 122 can provide centralized management of the network via a graphical user interface to enable a user to monitor, configure, and maintain the edge network devices 142 and links (e.g., Internet transport network 160, Multiprotocol Label Switching (MPLS) network 162, 4G/LTE network 164) in an underlay and overlay network. The network management appliance(s) 122 can support multi-tenancy and enable centralized management of logically isolated networks associated with different entities (e.g., enterprises, divisions within enterprises, groups within divisions, etc.). Alternatively or in addition, the network management appliance(s) 122 can be a dedicated network management system for a single entity. In some embodiments, physical or virtual Cisco® SD-WAN vManage appliances can operate as the network management appliance(s) 122.

The control plane 130 can build and maintain a network topology and make decisions on where traffic flows. The control plane 130 can include one or more physical or virtual network controller appliance(s) 132. The network controller appliance(s) 132 can establish secure connections to each network device 142 and distribute route and policy information via a control plane protocol (e.g., Overlay Management Protocol (OMP) (discussed in further detail below), Open Shortest Path First (OSPF), Intermediate System to Intermediate System (IS-IS), Border Gateway Protocol (BGP), Protocol-Independent Multicast (PIM), Internet Group Management Protocol (IGMP), Internet Control Message Protocol (ICMP), Address Resolution Protocol (ARP), Bidirectional Forwarding Detection (BFD), Link Aggregation Control Protocol (LACP), etc.). In some embodiments, the network controller appliance(s) 132 can operate as route reflectors. The network controller appliance(s) 132 can also orchestrate secure connectivity in the data plane 140 between and among the edge network devices 142. For example, in some embodiments, the network controller appliance(s) 132 can distribute crypto key information among the network device(s) 142. This can allow the network to support a secure network protocol or application (e.g., Internet Protocol Security (IPSec), Transport Layer Security (TLS), Secure Shell (SSH), etc.) without Internet Key Exchange (IKE) and enable scalability of the network. In some embodiments, physical or virtual Cisco® SD-WAN vSmart controllers can operate as the network controller appliance(s) 132.

The data plane 140 can be responsible for forwarding packets based on decisions from the control plane 130. The data plane 140 can include the edge network devices 142, which can be physical or virtual network devices. The edge network devices 142 can operate at the edges various network environments of an organization, such as in one or more data centers or colocation centers 150, campus networks 152, branch office networks 154, home office networks 156, and so forth, or in the cloud (e.g., Infrastructure as a Service (IaaS), Platform as a Service (PaaS), SaaS, and other cloud service provider networks). The edge network devices 142 can provide secure data plane connectivity among sites over one or more WAN transports, such as via one or more Internet transport networks 160 (e.g., Digital Subscriber Line (DSL), cable, etc.), MPLS networks 162 (or other private packet-switched network (e.g., Metro Ethernet, Frame Relay, Asynchronous Transfer Mode (ATM), etc.), mobile networks 164 (e.g., 3G, 4G/LTE, 5G, etc.), or other WAN technology (e.g., Synchronous Optical Networking (SONET), Synchronous Digital Hierarchy (SDH), Dense Wavelength Division Multiplexing (DWDM), or other fiber-optic technology; leased lines (e.g., T1/E1, T3/E3, etc.); Public Switched Telephone Network (PSTN), Integrated Services Digital Network (ISDN), or other private circuit-switched network; small aperture terminal (VSAT) or other satellite network; etc.). The edge network devices 142 can be responsible for traffic forwarding, security, encryption, quality of service (QoS), and routing (e.g., BGP, OSPF, etc.), among other tasks. In some embodiments, physical or virtual Cisco® SD-WAN vEdge routers can operate as the edge network devices 142.

Figure 2:
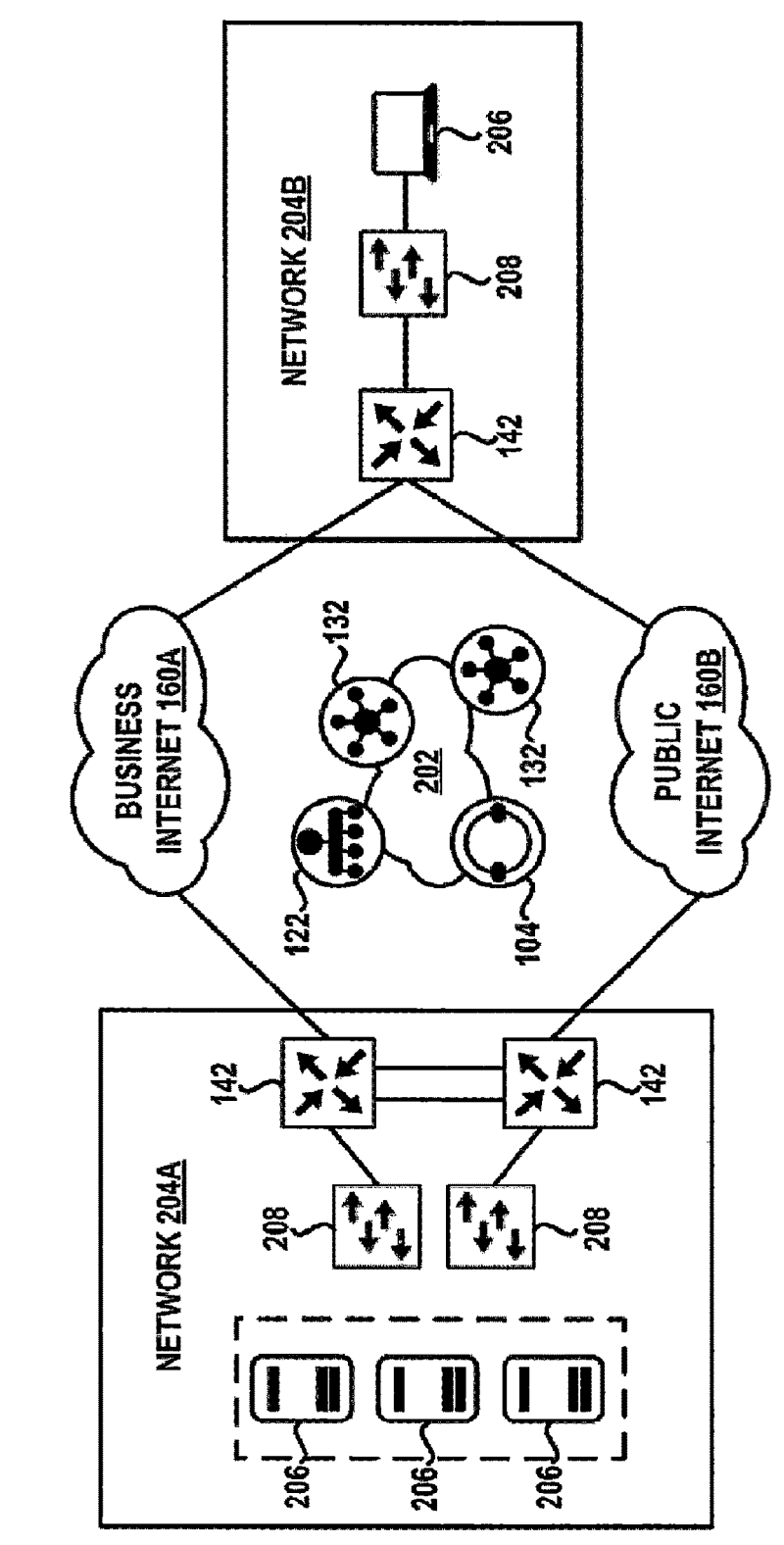
FIG. 2 illustrates an example of a network topology in accordance with some aspects of the present technology.

FIG. 2 illustrates an example of a network topology 200 for showing various aspects of the network architecture 100. The network topology 200 can include a management network 202, a pair of network sites 204A and 204B (collectively, 204) (e.g., the data center(s) 150, the campus network(s) 152, the branch office network(s) 154, the home office network(s) 156, cloud service provider network(s), etc.), and a pair of Internet transport networks 160A and 160B (collectively, 160). The management network 202 can include one or more network orchestrator appliances 104, one or more network management appliance 122, and one or more network controller appliances 132. Although the management network 202 is shown as a single network in this example, one of ordinary skill in the art will understand that each element of the management network 202 can be distributed across any number of networks and/or be co-located with the sites 204. In this example, each element of the management network 202 can be reached through either transport network 160A or 160B.

Each site can include one or more endpoints 206 connected to one or more site network devices 208. The endpoints 206 can include general purpose computing devices (e.g., servers, workstations, desktop computers, etc.), mobile computing devices (e.g., laptops, tablets, mobile phones, etc.), wearable devices (e.g., watches, glasses or other head-mounted displays (HMDs), ear devices, etc.), and so forth. The endpoints 206 can also include Internet of Things (IoT) devices or equipment, such as agricultural equipment (e.g., livestock tracking and management systems, watering devices, unmanned aerial vehicles (UAVs), etc.); connected cars and other vehicles; smart home sensors and devices (e.g., alarm systems, security cameras, lighting, appliances, media players, HVAC equipment, utility meters, windows, automatic doors, door bells, locks, etc.); office equipment (e.g., desktop phones, copiers, fax machines, etc.); healthcare devices (e.g., pacemakers, biometric sensors, medical equipment, etc.); industrial equipment (e.g., robots, factory machinery, construction equipment, industrial sensors, etc.); retail equipment (e.g., vending machines, point of sale (POS) devices, Radio Frequency Identification (RFID) tags, etc.); smart city devices (e.g., street lamps, parking meters, waste management sensors, etc.); transportation and logistical equipment (e.g., turnstiles, rental car trackers, navigational devices, inventory monitors, etc.); and so forth.

The site network devices 208 can include physical or virtual switches, routers, and other network devices. Although the site 204A is shown including a pair of site network devices and the site 204B is shown including a single site network device in this example, the site network devices 208 can comprise any number of network devices in any network topology, including multi-tier (e.g., core, distribution, and access tiers), spine-and-leaf, mesh, tree, bus, hub and spoke, and so forth. For example, in some embodiments, one or more data center networks may implement the Cisco® Application Centric Infrastructure (ACI) architecture and/or one or more campus networks may implement the Cisco® Software Defined Access (SD-Access or SDA) architecture. The site network devices 208 can connect the endpoints 206 to one or more edge network devices 142, and the edge network devices 142 can be used to directly connect to the transport networks 160.

In some embodiments, "color" can be used to identify an individual WAN transport network, and different WAN transport networks may be assigned different colors (e.g., mpls, private1, biz-internet, metro-ethernet, lte, etc.). In this example, the network topology 200 can utilize a color called "biz-internet" for the Internet transport network 160A and a color called "public-internet" for the Internet transport network 160B.

In some embodiments, each edge network device 208 can form a Datagram Transport Layer Security (DTLS) or TLS control connection to the network controller appliance(s) 132 and connect to any network control appliance 132 over each transport network 160. In some embodiments, the edge network devices 142 can also securely connect to edge network devices in other sites via IPSec tunnels. In some embodiments, the BFD protocol may be used within each of these tunnels to detect loss, latency, jitter, and path failures.

On the edge network devices 142, color can be used help to identify or distinguish an individual WAN transport tunnel (e.g., no same color may be used twice on a single edge network device). Colors by themselves can also have significance. For example, the colors metro-ethernet, mpls, and private1, private2, private3, private4, private5, and private6 may be considered private colors, which can be used for private networks or in places where there is no NAT addressing of the transport IP endpoints (e.g., because there may be no NAT between two endpoints of the same color). When the edge network devices 142 use a private color, they may attempt to build IPSec tunnels to other edge network devices using native, private, underlay IP addresses. The public colors can include 3g, biz, internet, blue, bronze, custom1, custom2, custom3, default, gold, green, lte, public-internet, red, and silver. The public colors may be used by the edge network devices 142 to build tunnels to post-NAT IP addresses (if there is NAT involved). If the edge network devices 142 use private colors and need NAT to communicate to other private colors, the carrier setting in the configuration can dictate whether the edge network devices 142 use private or public IP addresses. Using this setting, two private colors can establish a session when one or both are using NAT.

For clarity of explanation, in some instances the present technology may be presented as including individual functional blocks including functional blocks comprising devices, device components, steps or routines in a method embodied in software, or combinations of hardware and software.

Figure 3:
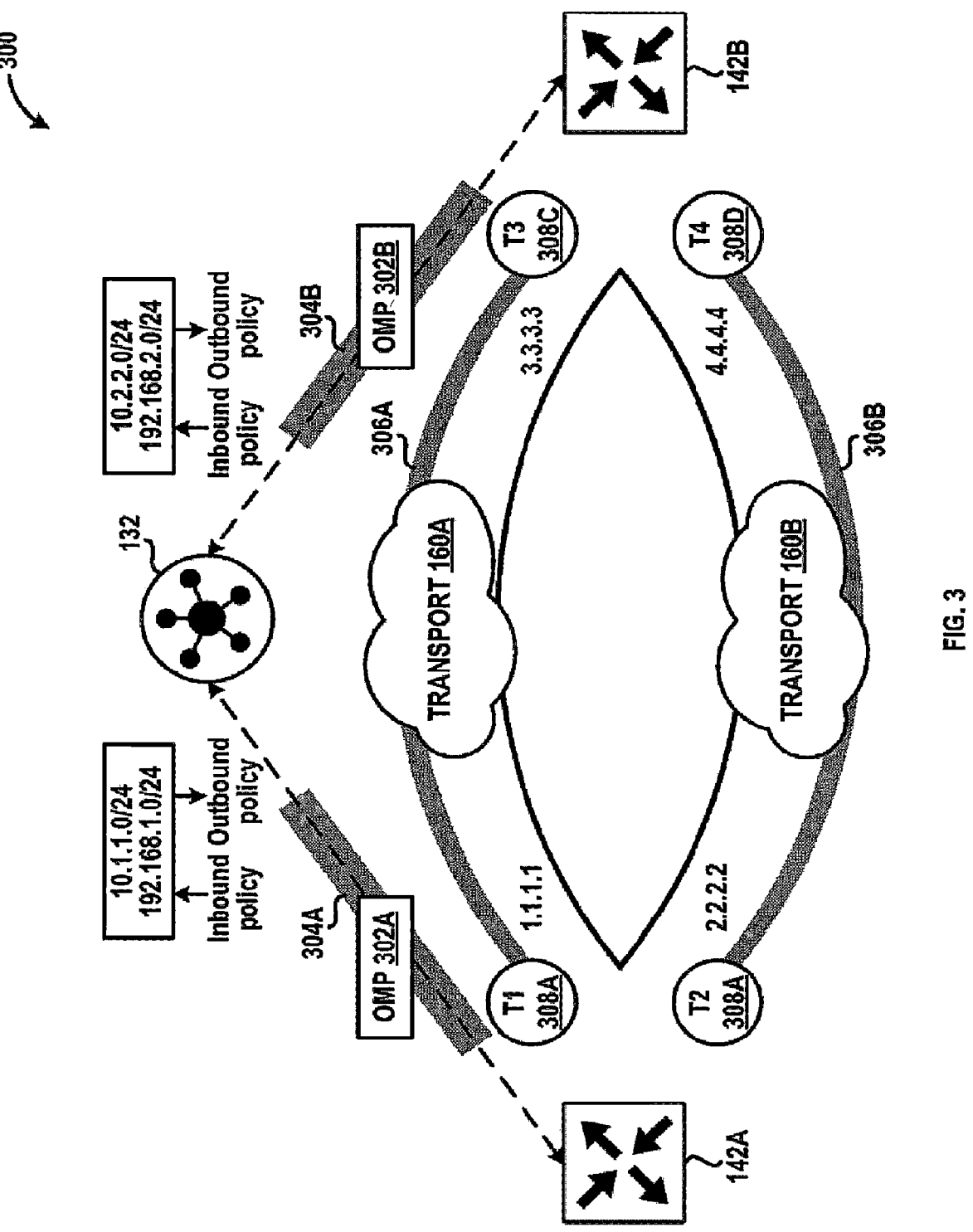
FIG. 3 illustrates an example of a diagram showing the operation of a protocol for managing an overlay network in accordance with some aspects of the present technology.

FIG. 3 illustrates an example of a diagram 300 showing the operation of OMP, which may be used in some embodiments to manage an overlay of a network (e.g., the network architecture 100). In this example, OMP messages 302A and 302B (collectively, 302) may be transmitted back and forth between the network controller appliance 132 and the edge network devices 142A and 142B, respectively, where control plane information, such as route prefixes, next-hop routes, crypto keys, policy information, and so forth, can be exchanged over respective secure DTLS or TLS connections 304A and 304B. The network controller appliance 132 can operate similarly to a route reflector. For example, the network controller appliance 132 can receive routes from the edge network devices 142, process and apply any policies to them, and advertise routes to other edge network devices 142 in the overlay. If there is no policy defined, the edge network devices 142 may behave in a manner similar to a full mesh topology, where each edge network device 142 can connect directly to another edge network device 142 at another site and receive full routing information from each site.

OMP can advertise three types of routes:

OMP routes, which can correspond to prefixes that are learned from the local site, or service side, of the edge network device 142. The prefixes can be originated as static or connected routes, or from within, for example, the OSPF or BGP protocols, and redistributed into OMP so they can be carried across the overlay. OMP routes can advertise attributes such as transport location (TLOC) information (which can be similar to a BGP next-hop IP address) and other attributes such as origin, originator, preference, site identifier, tag, and virtual private network (VPN). An OMP route may be installed in the forwarding table if the TLOC to which it points is active.

TLOC routes, which can correspond to logical tunnel termination points on the edge network devices 142 that connect into the transport networks 160. In some embodiments, a TLOC route can be uniquely identified and represented by a three-tuple, including an IP address, link color, and encapsulation (e.g., Generic Routing Encapsulation (GRE), IPSec, etc.). In addition to system IP address, color, and encapsulation, TLOC routes can also carry attributes such as TLOC private and public IP addresses, carrier, preference, site identifier, tag, and weight. In some embodiments, a TLOC may be in an active state on a particular edge network device 142 when an active BFD session is associated with that TLOC.

Service routes, which can represent services (e.g., firewall, distributed denial of service (DDoS) mitigator, load balancer, intrusion prevent system (IPS), intrusion detection systems (IDS), WAN optimizer, etc.) that may be connected to the local sites of the edge network devices 142 and accessible to other sites for use with service insertion. In addition, these routes can also include VPNs; the VPN labels can be sent in an update type to tell the network controller appliance 132 what VPNs are serviced at a remote site.

In the example of FIG. 3, OMP is shown running over the DTLS/TLS tunnels 304 established between the edge network devices 142 and the network controller appliance 132. In addition, the diagram 300 shows an IPSec tunnel 306A established between TLOC 308A and 308C over the WAN transport network 160A and an IPSec tunnel 306B established between TLOC 308B and TLOC 308D over the WAN transport network 160B. Once the IPSec tunnels 306A and 306B are established, BFD can be enabled across each of them.

Current Problems With Per-Hop Encryption and End-To-End Encryption

Figures 4A, 4B:
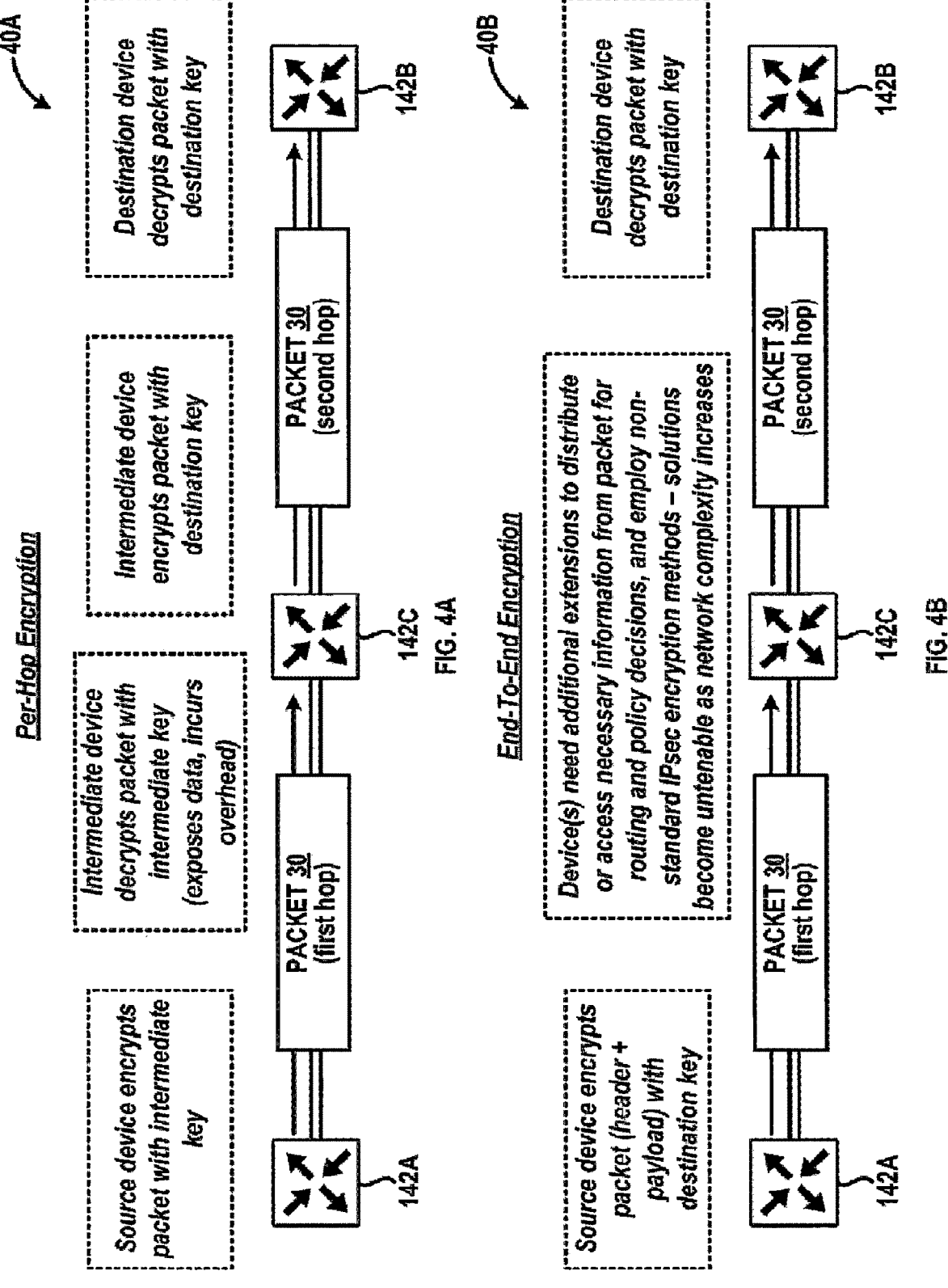
FIG. 4A illustrates per-hop encryption.
FIG. 4B illustrates end-to-end encryption.
Figure 4C:
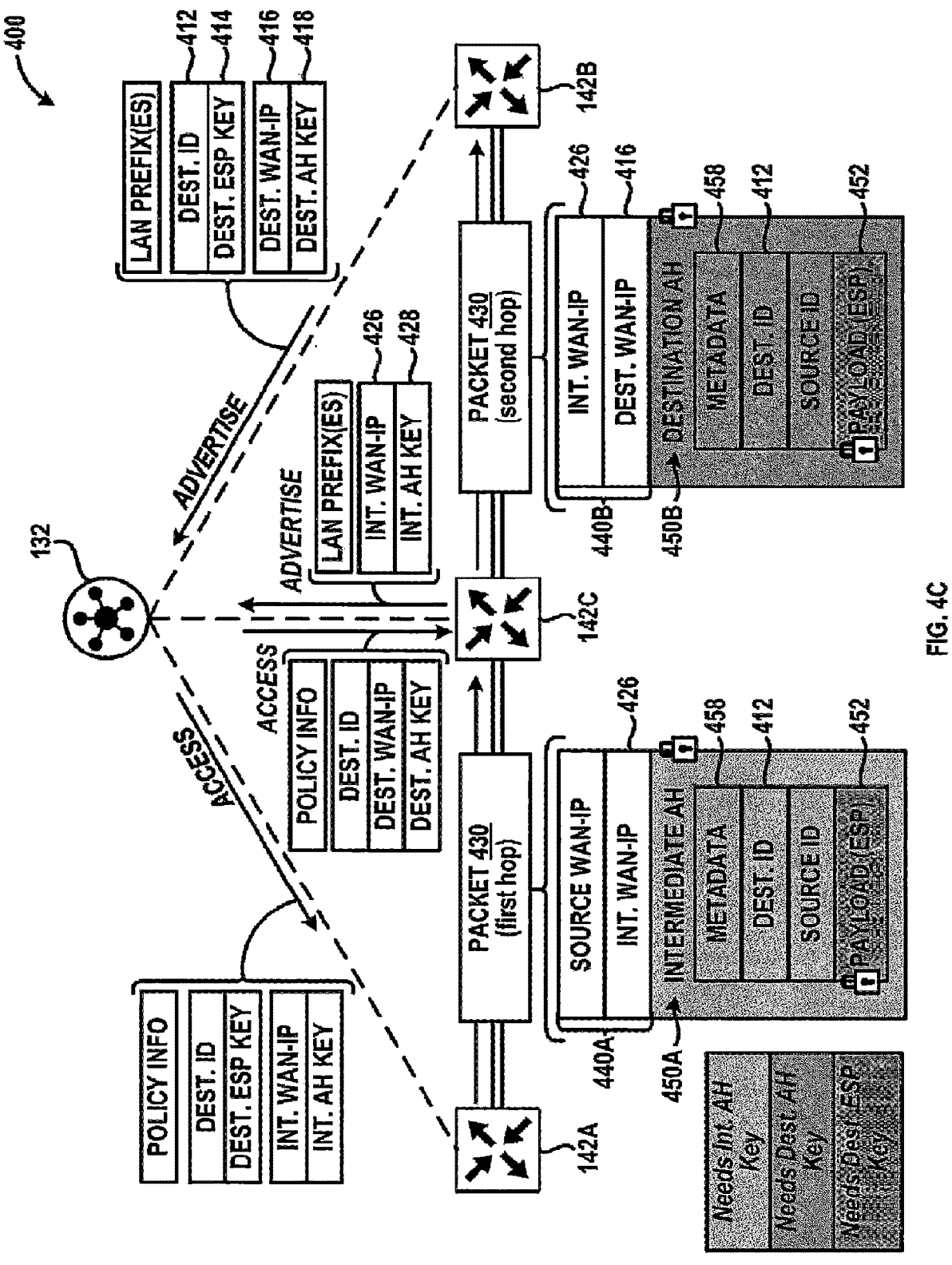
FIG. 4C illustrates a system for end-to-end encryption with per-hop integrity protection and decision making in accordance with some aspects of the present technology.

FIGS. 4A and 4B illustrate current methods for encryption in SD-WANs having spoke-hub topologies, in contrast with FIG. 4C which illustrates a solution outlined herein. FIG. 4A in particular illustrates a simplified example of a first SD-WAN 40A employing standard "per-hop" encryption in which a source device 142A needs to send a packet 30 to a destination device 142B through an intermediate device 142C (e.g., a "hub"). The source device 142A encrypts the packet 30 with an intermediate key associated with the intermediate device 142C and transmits the packet 30 to the intermediate device 142C, completing a "first hop". Upon receipt, the intermediate device 142C decrypts the packet 30 with the intermediate key, thereby exposing the data within the packet 30 to the intermediate device 142C as well as incurring overhead due to the "decryption" step. Decrypting the packet 30 allows the intermediate device 142C to access pertinent information for routing and other functionalities in accordance with network policy. Once the intermediate device 142C determines how to forward the packet 30, the intermediate device 142C re-encrypts the packet 30 with a destination key associated with the destination device 142B and transmits the packet 30 to the destination device 142B, completing a "second hop". The re-encryption step incurs further overhead at the intermediate device 142C. Upon receipt, the destination device 142B decrypts the packet 30 using the destination key.

While relatively straightforward, per-hop encryption incurs encrypt/decrypt overhead on the intermediate hops, introduces latency and impacts throughput and overall application experience of any multi-hop traffic such as branch-to-branch traffic and other traffic not terminating on the hub. The greater the number of intermediate hops, the greater the impact, for example, in hierarchical SDWAN topologies commonly used to interconnect regional SDWANs in a global SDWAN network. This is applicable to Enterprise/customer-owned (DIY) SDWAN deployments as well as managed SDWAN deployments. More importantly, in case of SDWAN-as-a-Service managed SDWAN deployments with multi-tenant regional/transit hubs, decryption on the hub would expose customer data traffic in cleartext, breaking data privacy which would not be acceptable to many customers and would also have implications on regulatory compliance for customers dealing with sensitive data.

FIG. 4B shows another simplified example where a second SD-WAN 40B employs "end-to-end" encryption in which the source device 142A needs to send the packet 30 to the destination device 142B through the intermediate device 142C (e.g., the "hub"). In this example, the source device 142A encrypts the packet (including header and payload) with a destination key associated with the destination device 142B and transmits the packet 30 to the intermediate device 142C which forwards the packet 30 to the destination device 142B. A challenge with end-to-end encryption is the inaccessibility of the inner packet (header and payload) at the intermediate nodes for routing and policy decisions. Hence, any solution for end-to-end encryption must also address the problem of path selection at intermediate hops as these are inter-dependent. However, current methods of "end-to-end" encryption often involve non-standard IPsec encryption methods, which are untenable and non-scalable as network complexity increases. In particular, the existing methods of end-to-end encryption use either source-routing based on label stack/switching or segment routing for packet forwarding on the intermediate hops. These methods require additional protocols or extensions to distribute labels that have the associated complexity. Also, these methods employ non-standard IPsec encryption that would not be able to leverage off-the-shelf hardware crypto engines or accelerators that perform efficient encryption and IPsec encapsulation.

Present Solution

A system and associated methods outlined herein are directed to facilitating communication between nodes of a network with end-to-end encryption for privacy while allowing per-hop routing decisions on intermediate nodes for path redundancy and optimal path selection. The methods outlined herein leverage unique SD-WAN edge identities (e.g., for each edge device of the network) and their advertisements in SD-WAN overlay. Further, the methods outlined herein enable the use of standard IPsec for encryption and encapsulation, and is thus more efficient and simpler to implement.

Under current SD-WANs, each SD-WAN edge device that is either deployed at a branch, regional hub or datacenter is assigned a unique device identifier referred to as a "System-IP". In SD-WAN overlay routing protocol (e.g., Overlay Management Protocol (OMP)), each SD-WAN edge device advertises information about itself including its local area network (LAN) subnets, wide area network (WAN) IPs, System-IP (the unique device identifier), and IPsec encryption keys/key-material to an SD-WAN centralized management controller device of the network (e.g., "vSmart"), which in turn advertises this information to other SD-WAN edge devices.

The methods outlined herein leverage this existing functionality by uniquely associating an encryption key for a device with the unique device identifier (e.g., System-IP) for end-to-end encryption. Further, an authentication header key for the device can be uniquely associated with a network address (e.g., WAN IP, etc.) for encapsulation and routing. This results in two identifiers (unique device ID and network address) and two different keys (IPsec Encapsulating Security Payload (ESP) key for encryption and IPsec Authentication Header (AH) key for encapsulation and integrity protection) for the same device.

FIG. 4C illustrates an SD-WAN network 400 having spoke-hub topology in which a source device 142A (e.g., a first edge device associated with branch 1) needs to transmit a packet 430 to a destination device 142B (e.g., a second edge device associated with branch 2) through an "intermediate" device 142C (e.g., an intermediate "hub" edge device between branch 1 and branch 2).

Each device 142A-142C, regardless of their specific role in the example (source, intermediate, destination), can be uniquely associated with a device identifier, an encryption key (e.g., an IPsec ESP key) associated with the device identifier, a network address, and an authentication header key associated with the network address. This information can be advertised from the associated device 142A-142C to a controller 132, or alternatively, directly to another device (e.g., from the destination device 142B to the source device 142A where the destination device 142B is to receive the packet 430 from the source device 142A).

Note that the source device 142A, the intermediate device 142C, or the destination device 142B may take on different roles depending on the direction of traffic. For example, a first edge device may be a source device for a first flow but may be a destination device for a second flow. The "hub" edge device may be an intermediate device for the first flow or the second flow, but may be a source device or a destination device for a third flow. Further, while some examples herein are illustrated with the device identifiers being System-IPs, the device identifier could be any other type of value or identity that can be directly used to identify the associated device, or that can be indirectly used to identify the device by means of a hash. This is useful if some customers may not want the identities of the source/destination devices to be carried as-is between hops.

Stage 1: From Source Device to Intermediate Device

A. Encryption: With continued reference to FIG. 4C, the destination device 142B is uniquely associated with destination information including a destination device identifier 412 ("destination System-IP" or other unique identifier) and a destination encryption key 414 ("destination IPsec ESP key", shown in FIG. 4C as "Dest. ESP Key"), which can be accessed by the source device 142A following advertisement by the controller device 132 of the network (or alternatively, directly from the destination device 142B, which could apply in scenarios where there are no controller device(s) in the network or are otherwise unavailable). The source device 142A first encrypts a payload 452 of the packet 430 using the destination encryption key 414 associated with the destination device 142B that is not known to the intermediate device 142C. This allows the destination device 142B to eventually decrypt the payload 452 upon receipt, while preventing the intermediate device 142C from accessing the content of the payload 452. The source device 142A can encrypt the payload 452 using IPsec Encapsulating Security Payload (ESP) protocol.

B. Encapsulation: Following encryption, the source device 142A adds the destination device identifier 412 along with metadata 458 to the (encrypted) payload 452, which the source device 142A can encapsulate within an "intermediate authentication header" 450A of the packet 430 that is accessible to the intermediate device 142C as will be discussed in greater detail herein. The intermediate authentication header 450A can also include a source device identifier that is uniquely associated with the source device 142A. The metadata 458 added to the intermediate authentication header 450A of the packet 430 can indicate a class of traffic associated with the packet 430, as well as any other pertinent information that the intermediate device 142C would need to access to route the packet 430 to the destination device 142B in accordance with various policies to be enforced. Such metadata 458 can include, for example, an SLA-class, an App-id, a VPN label, an SGT-tag, etc. associated with the flow that the packet 430 belongs to.

The intermediate device 142C is uniquely associated with intermediate authentication header information including an intermediate network address 426 (such as a "intermediate WAN IP"; denoted as "Int. WAN-IP" in FIG. 4C) and an intermediate authentication header key 428 ("intermediate IPsec AH key"; denoted as "Int. AH Key" in FIG. 4C), which can likewise be accessed by the source device 142A following advertisement by the controller device 132 of the network (or, alternatively, directly from the intermediate device 142C). Following addition of the and the to the encrypted payload 452, the source device 142A encapsulates the encrypted payload 452, the destination device identifier

412, a source device identifier, and the metadata 458 within the intermediate authentication header 450A using the intermediate authentication header key 428 that is known to the intermediate device 142C. This allows the intermediate device 142C to eventually decapsulate the information within the intermediate authentication header 450A and access the metadata 458 and the destination device identifier 412 upon receipt, while providing "integrity protection" of the traffic between the source device 142A and the intermediate device 142C. Unless the intermediate device 142C has the destination encryption key 414, the intermediate device 142C is unable to access the contents of the encrypted payload 452, thus maintaining privacy between the source device 142C and the destination device 142B while still allowing the intermediate device 142C to make decisions about routing and policy for the packet 430. The source device 142A can encapsulate the packet 430 using an IPsec Authentication Header (AH) protocol. Following encapsulation, the source device 142A can add routing information 440A to the packet that indicates the intermediate network address 426 (where the routing information is external to the intermediate authentication header 450A), and can transmit the packet 430 including the intermediate authentication header 450A onward to the intermediate device 142C.

Note that if the intermediate device 142C is shared by multiple customers, the controller device 132 can ensure that encryption keys associated with the source device 142A and the destination device 142B are not shared with the intermediate device 142C. If the intermediate device 142C is owned by a single customer, then the controller device 132 can share the encryption keys associated with the source device 142A and destination device 142B with the intermediate device 142C, which the intermediate device 142C may use to encrypt traffic from the intermediate device 142C to the destination device 142B but not for transit traffic.

Stage 2: From Intermediate Device to Destination Device

A. Decapsulation: Upon receipt of the packet 430 at the intermediate device 142C, the intermediate device 142C can decapsulate the intermediate authentication header 450A using the intermediate authentication header key 428. Decapsulation can be performed by the intermediate device 142C using the IPsec AH protocol. Following decapsulation, the intermediate device 142C can access information had been previously encapsulated within the intermediate authentication header 450A of the packet 430, including the metadata 458 and the destination device identifier 412. Note that, as intended, the intermediate device 142C is unable to decrypt the encrypted information within the packet 430 (as the destination encryption key 414 may not be known by the intermediate device 142C in some cases, such as when the intermediate device 142C is shared by multiple customers). At this point, the intermediate device 142C can use the metadata 458 and the destination device identifier 412 to make an informed decision on if and how it should route the packet onward to the destination device 142B in accordance with various policies that govern operation of the network. For example, the intermediate device 142C may need to send the packet 430 onward to another intermediate device 142C instead of forwarding directly to the destination device 142B. This step can also include accessing policy information associated with the packet 430 based on the metadata 458. The intermediate device 142C may need to enforce certain policies that may be dependent upon information within the metadata 458 such as the type of traffic associated with the packet 430 (e.g., video, voice, text, interactive, etc. which may be indicated using SLA-class and/or App-id, etc.). The intermediate device 142C may also cross-reference the destination device identifier 412 with its own device identifier (intermediate device identifier), e.g., to determine if the intermediate device 142C is the intended end recipient or not. Consider for this example that the intermediate device 142C is not the intended destination device, and that the intermediate device 142C must forward the packet 430 onward to the destination device 142B.

B. Re-encapsulation: The destination device 142B is also uniquely associated with destination authentication header information including a destination network address 416 (such as a "destination WAN IP"; denoted as "Dest. WAN-IP" in FIG. 4C) and a destination authentication header key 418 ("destination IPsec AH key"; denoted as "Dest. AH Key" in FIG. 4C), which can likewise be advertised to the intermediate device 142C via the controller device 132 of the network (or alternatively, directly from the destination device 142B). Following decapsulation, the intermediate device 142C can use the destination device identifier 412 that had been previously encapsulated within the intermediate authentication header to identify the destination device 142B and access the destination network address 416 and the destination authentication header key 418. The intermediate device 142C can then encapsulate the packet 430 (including the encrypted payload 452, the metadata 458 and destination device identifier 412) within a destination authentication header 450B using the destination authentication header key 418 that is known to the destination device 142B. Likewise, the intermediate device 142C can encapsulate the packet 430 using an IPsec AH protocol. Following encapsulation, the intermediate device 142C can add routing information 440B to the packet 430 that indicates the destination network address 416 as well as the intermediate network address 426, and transmit the packet 430 including the destination authentication header 450B onward to the destination device 142B.

C. Receipt at Destination Device: Upon receipt of the packet 430 at the destination device 142B, the destination device 142B can decapsulate the destination authentication header 450B using the destination authentication header key 418. Likewise, decapsulation can be performed using the IPsec AH protocol. Following decapsulation, the destination device 142B can access information that had been previously encapsulated within the destination authentication header 450B of the packet 430, including the metadata 458 and the destination device identifier 412. The destination device 142B can identify that the destination device identifier 412 correlates with the destination device identifier that belongs to the destination device 142B, e.g., to determine that the destination device 142B is the intended recipient. If so, the destination device 142B can then decrypt the payload 452 using the destination encryption key 414. The destination device 142B can perform decryption using an IPsec ESP protocol.

Figure 5A:
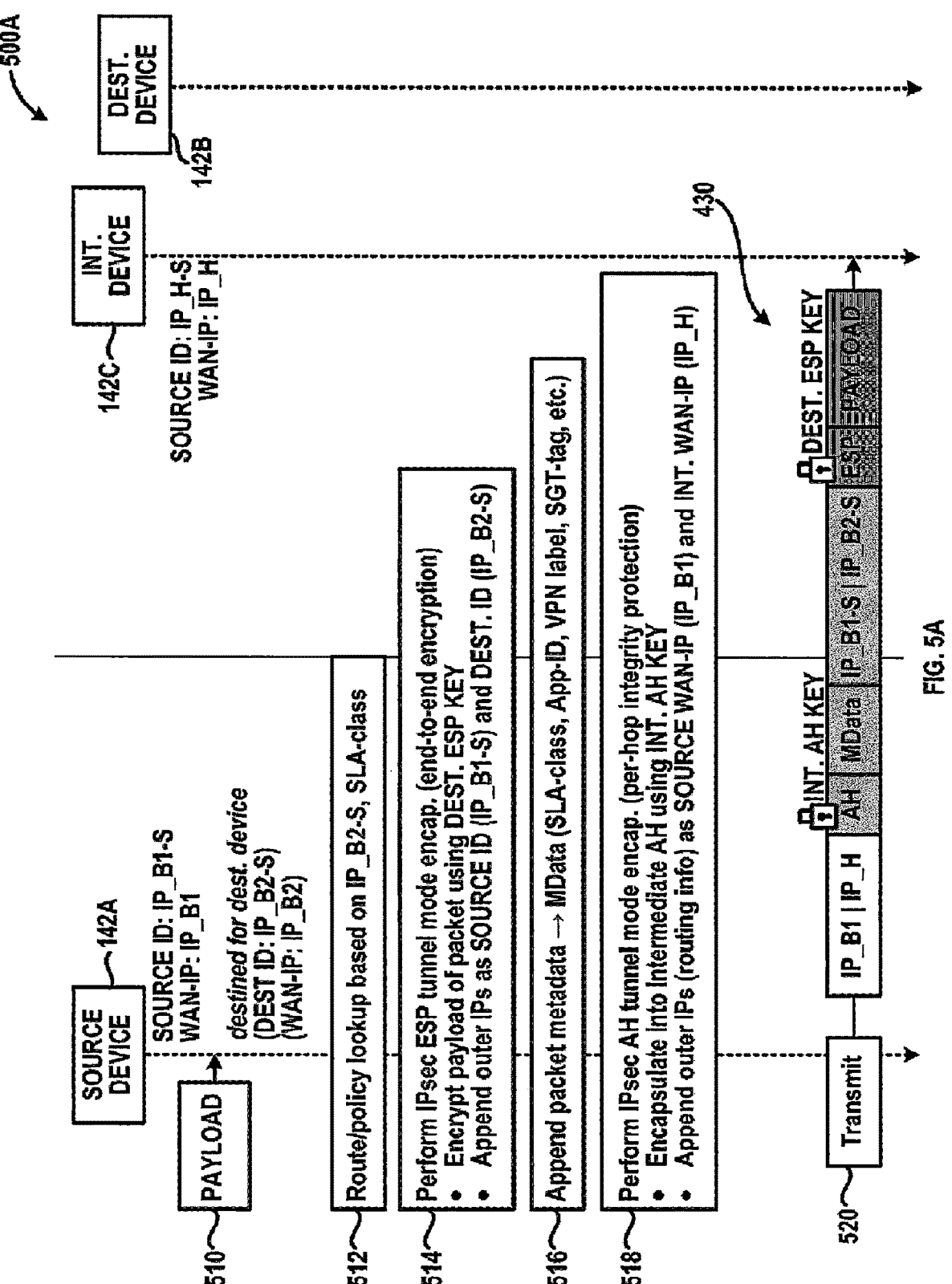
FIG. 5A illustrates a sequence diagram showing processing of a packet at a source device in accordance with some aspects of the present technology.
Figure 5B:
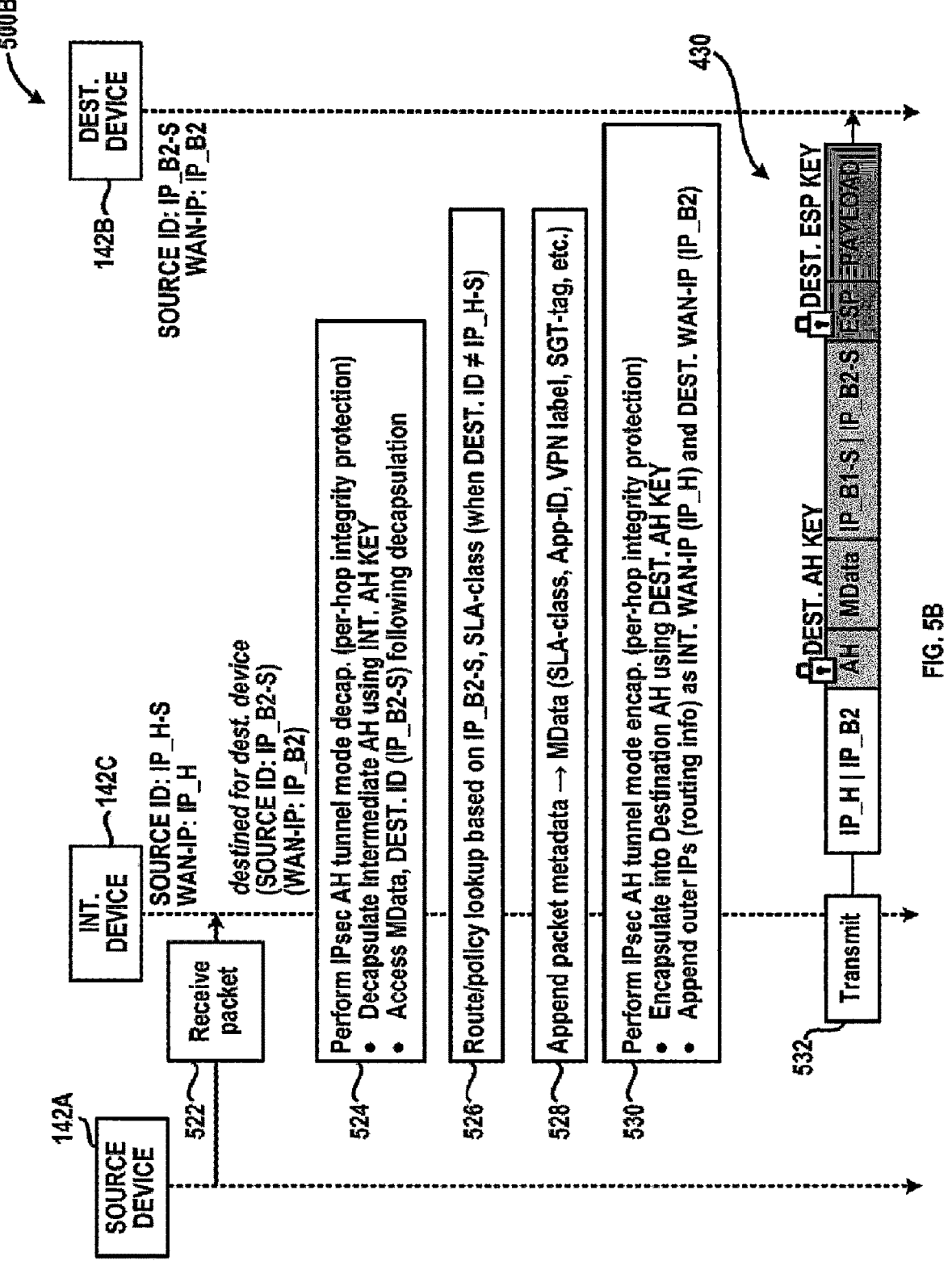
FIG. 5B illustrates a sequence diagram showing processing of the packet of FIG. 5A at an intermediate device in accordance with some aspects of the present technology.
Figure 5C:
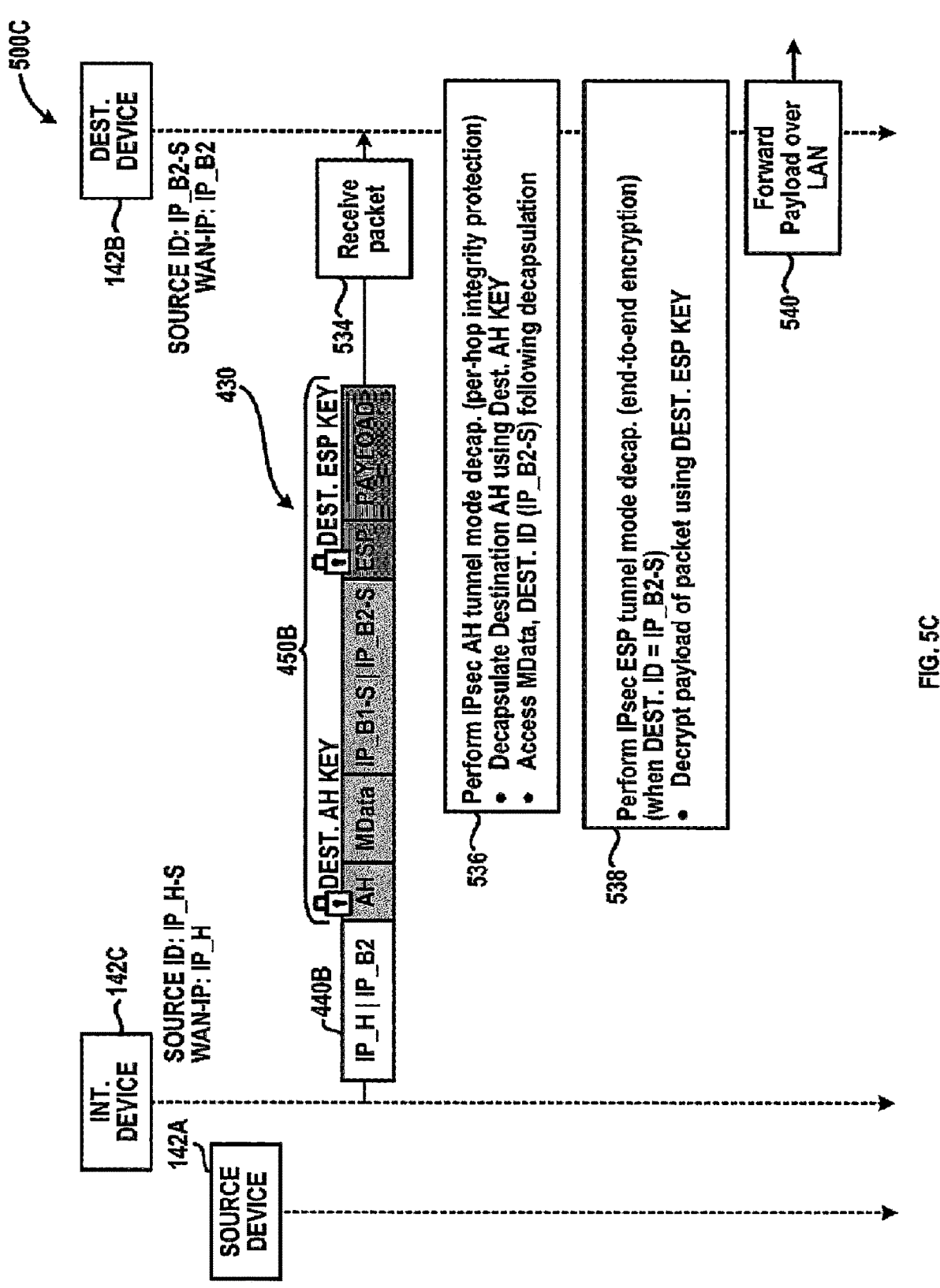
FIG. 5C illustrates a sequence diagram showing processing of the packet of FIG. 5A at a destination device in accordance with some aspects of the present technology.

FIGS. 5A-5C are a series of sequence diagrams illustrating an example implementation of the systems outlined herein, where the source device 142A sends a packet (e.g., packet 430) to the destination device 142B through the intermediate device 142C. Note that in practicality, there may be more than one intermediate device between the source device 142A and the destination device 142B, requiring additional hops; however for brevity this example shows a single intermediate device 142C (2 hops total). Each SD-WAN edge router (devices 142A-142C) is assigned a unique identity (e.g., a "system-IP") that is advertised in SDWAN overlay (e.g., {LAN-Prefix, System-IP and the associated end-end IPsec ESP key, WAN-IPs and the associated per-hop IPsec AH keys}). Such information can be maintained by a controller (e.g., controller device 132 shown in FIG. 4C). In this example, the source device 142A can uniquely have a source device identifier "IP_B1-S" and a network address (e.g., a WAN-IP address) denoted in FIG. 5A as "IP_B1". The destination device 142B can likewise uniquely have a destination device identifier "IP_B2-S" and a network address (e.g., a WAN-IP address) denoted in FIG. 5A as "IP_B2". Further, the controller (as well as the source device 142A, the destination device 142B, and intermediate device(s) 142C) can pre-define SLA-classes for traffic (voice, video, interactive etc.). The controller and devices 142A-142C can also maintain a real-time database of WAN paths & their SLA-class conformance.

A first sequence diagram 500A of FIG. 5A corresponds to a first phase involving processing at the source device 142A. At step 510, the source device 142A receives the payload of the packet 430 (e.g., from a user device or another device connected over LAN) destined for the destination device 142B. At step 512, the source device 142A performs route and policy lookup that yields:

SLA class required for the packet/flow

Remote (Branch2) system IP and corresponding IPsec ESP key (e.g., destination device identifier 412 and destination encryption key 414 shown in FIG. 4C)

Next-hop (Hub) WAN IP and corresponding IPsec AH key (e.g., intermediate network address 426 and intermediate authentication header key 428 shown in FIG. 4C)

At step 514 the source device 142A performs IPsec ESP tunnel-mode encryption/encapsulation (end-to-end encryption) using:

IPsec ESP key for Branch2 (e.g., destination encryption key 414 shown in FIG. 4C).

Outer IPs as Branch1 & Branch2 System IPs (IP[B1-S] and IP[B2-S]) (e.g., source device identifier and destination device identifier 412 shown in FIG. 4C)

At step 516 the source device 142A appends packet metadata (e.g., metadata 458 shown in FIG. 4C) to the packet 430, including VPN label, App-id, SLA-class. At step 518 the source device 142A performs IPsec AH tunnel mode encapsulation (per-hop integrity protection) with:

IPsec AH key for intermediate device (e.g., intermediate authentication header key 428 shown in FIG. 4C).

Outer IPs as source device and intermediate device WAN IPs (IP[B1]→IP[H]) (e.g., source network address and intermediate network address 426 shown in FIG. 4C).

At step 520 the source device 142A transmits the packet 430 to the intermediate device 142C.

A second sequence diagram 500B of FIG. 5B corresponds to a second phase involving processing at the intermediate device 142C. At step 522, the intermediate device 142C receives the packet 430 from the source device 142A, where the packet 430 is end-to-end encrypted between the source device 142A and the destination device 142B using IPsec ESP, and integrity-protected between the source device 142A and the intermediate device 142C using IPsec AH. At step 524, the intermediate device 142C decapsulates the outer IPsec-AH that is between the source device 142A and the intermediate device 142C and retrieves the following information:

Packet metadata that includes the packet SLA-class, App-id, VPN label (e.g., metadata 458 shown in FIG. 4C)

Destination System-IP (e.g., the destination device identifier 412 shown in FIG. 4C)

If the Destination IP is not the local system IP of the intermediate device 142C, then at step 526, the intermediate device 142C does the following:

Perform route and policy lookup based on the destination System-IP and VPN that yields possible paths, remote WAN IPs and the IPsec AH key Based on the packet metadata SLA-class, select the SLA compliant path At step 528, the intermediate device 142C appends the metadata back into the packet such as VPN label, App-id, SLA-class, etc. At step 530, the intermediate device 142C performs IPsec AH tunnel mode encapsulation (per-hop integrity protection) with:

IPsec AH key for destination device (destination authentication header key 418).

Outer IPs as intermediate device and destination device WAN IPs (IP[H]→IP[B2]) (e.g., intermediate network address 426 and destination network address 416)

At step 530, the intermediate device 142C transmits the packet. 430 to the destination device 142B.

A third sequence diagram 500C of FIG. SC corresponds to a third phase involving processing at the destination device 142B.

At step 532, the destination device 142B receives the packet 430 from the intermediate device 142C, where the packet 430 is end-to-end encrypted between the source device 142A and the destination device 142B using IPsec ESP, and integrity-protected between the intermediate device 142C and the destination device 142B using IPsec AH. At step 534, the destination device 142B decapsulates the outer IPsec-AH that is between the intermediate device 142C and the destination device 142B and retrieves the following information:

Packet metadata that includes the packet SLA-class, App-id, VPN label (e.g., metadata 458 shown in FIG. 4C)

Destination System-IP (e.g., the destination device identifier 412 shown in FIG. 4C)

If the Destination IP is the local system IP of the destination device 142B, then at steps 536 and 538, the destination device 142B decapsulates/decrypts the inner IPsec ESP header of the packet 430 using the destination encryption key 414 to access the original payload of the packet 430. If the destination device 142B is the final SD-WAN edge device and needs to forward the packet 430 to a locally-connected user device, then the destination device 142B can send the packet 430 to the locally-connected user device over LAN at step 540.

Figure 6A:
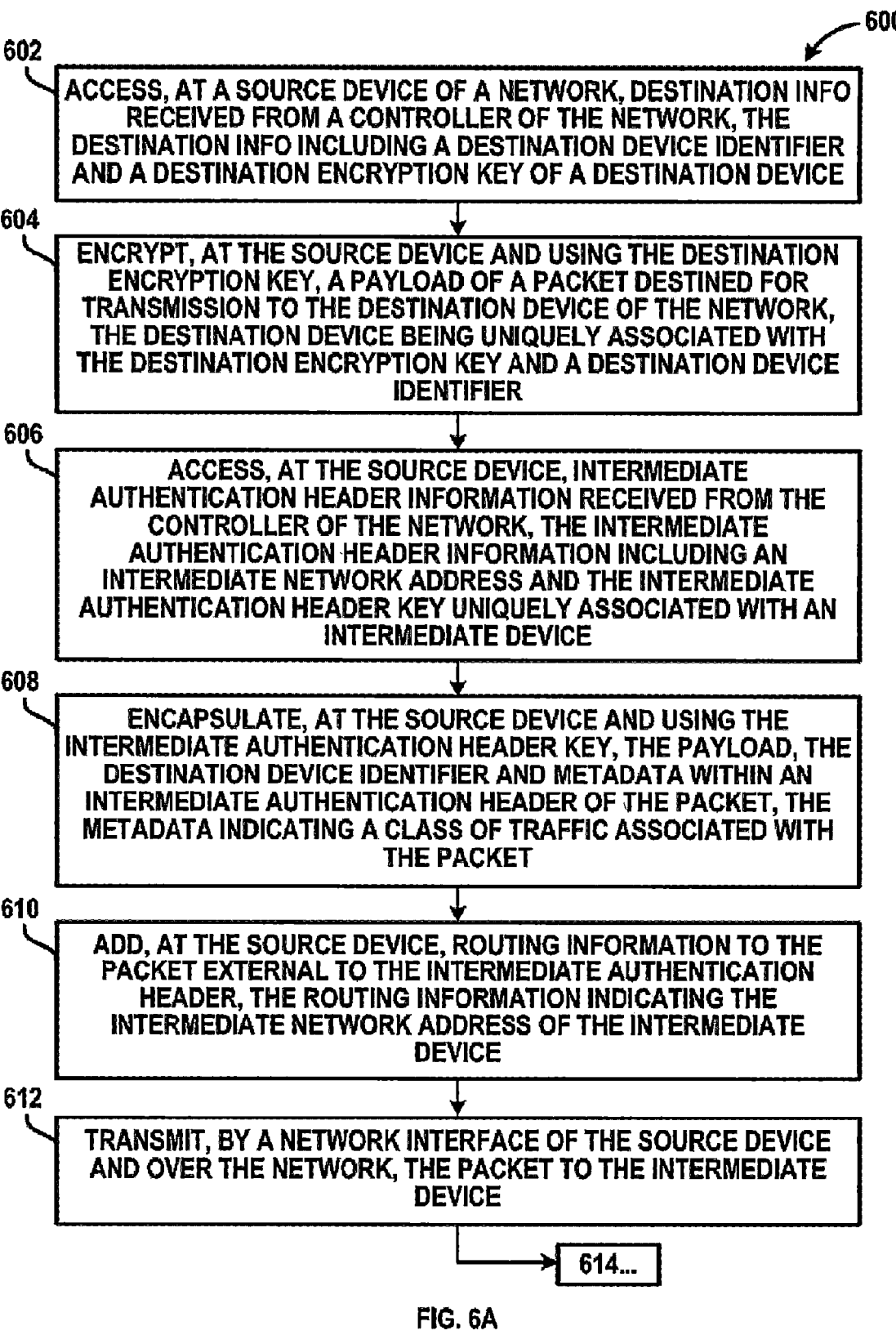

FIGS. 6A and 6B outline a method 600 for end-to-end encryption with per-hop integrity protection as discussed above with reference to FIGS. 4C-5C.

Referring to FIG. 6A, step 602 of method 600 includes accessing, at a source device (e.g., source device 142A) of a network, destination information received from a controller (e.g., controller 132) of the network, the destination information including the destination device identifier (e.g., destination device identifier 412) and the destination encryption key (e.g., destination encryption key 414) of the destination device. Step 604 of method 600 includes encrypting, at the source device and using the destination encryption key, a payload (e.g., payload 452) of a packet (e.g., packet 430) destined for transmission to the destination device of the network, the destination device being uniquely associated with the destination encryption key and the destination device identifier. Step 606 of method 600 includes accessing, at the source device, intermediate authentication header information received from the controller of the network, the intermediate authentication header information including an intermediate network address (e.g., intermediate network address 426) and the intermediate authentication header key (e.g., intermediate authentication header key 428) uniquely associated with an intermediate device (e.g., intermediate device 142C). Step 608 of method 600 includes encapsulating, at the source device and using the intermediate authentication header key uniquely associated with an intermediate device of the network, the payload, the destination device identifier and metadata (e.g., metadata 458) within an intermediate authentication header (e.g., intermediate authentication header 450A) of the packet, the metadata indicating a class of traffic associated with the packet. Step 610 of method 600 includes adding, at the source device, routing information (e.g., routing information 440A) to the packet external to the intermediate authentication header, the routing information indicating the intermediate network address of the intermediate device. Step 612 of method 600 includes transmitting, by a network interface of the source device and over the network, the packet having the intermediate authentication header to the intermediate device.

Referring to FIG. 6B, step 614 of method 600 includes decapsulating, at the intermediate device and using the intermediate authentication header key, the intermediate authentication header of the packet. Step 616 of method 600 includes accessing, at the intermediate device, destination authentication header information received from the controller of the network that includes a destination network address (e.g., destination network address 416) and a destination authentication header key (e.g., destination authentication header key 418) uniquely associated with the destination device. Step 618 of method 600 includes accessing, at the intermediate device, policy information associated with the packet based on the metadata for transmission of the packet to the destination device in accordance with the policy information. Step 620 of method 600 includes encapsulating, at the intermediate device and using the destination authentication header key, the payload, the destination device identifier, and the metadata within a destination authentication header (e.g., destination authentication header 450B). Step 622 of method 600 includes transmitting, by a network interface of the intermediate device and over the network, the packet with the destination authentication header to the destination device based on the destination network address of the destination device.

Step 624 of method 600 includes decapsulating, at the destination device and using the destination authentication header key uniquely associated with the destination device, the destination authentication header of the packet. Step 626 of method 600 includes decrypting, at the destination device, the packet using the destination encryption key.

Figure 7:
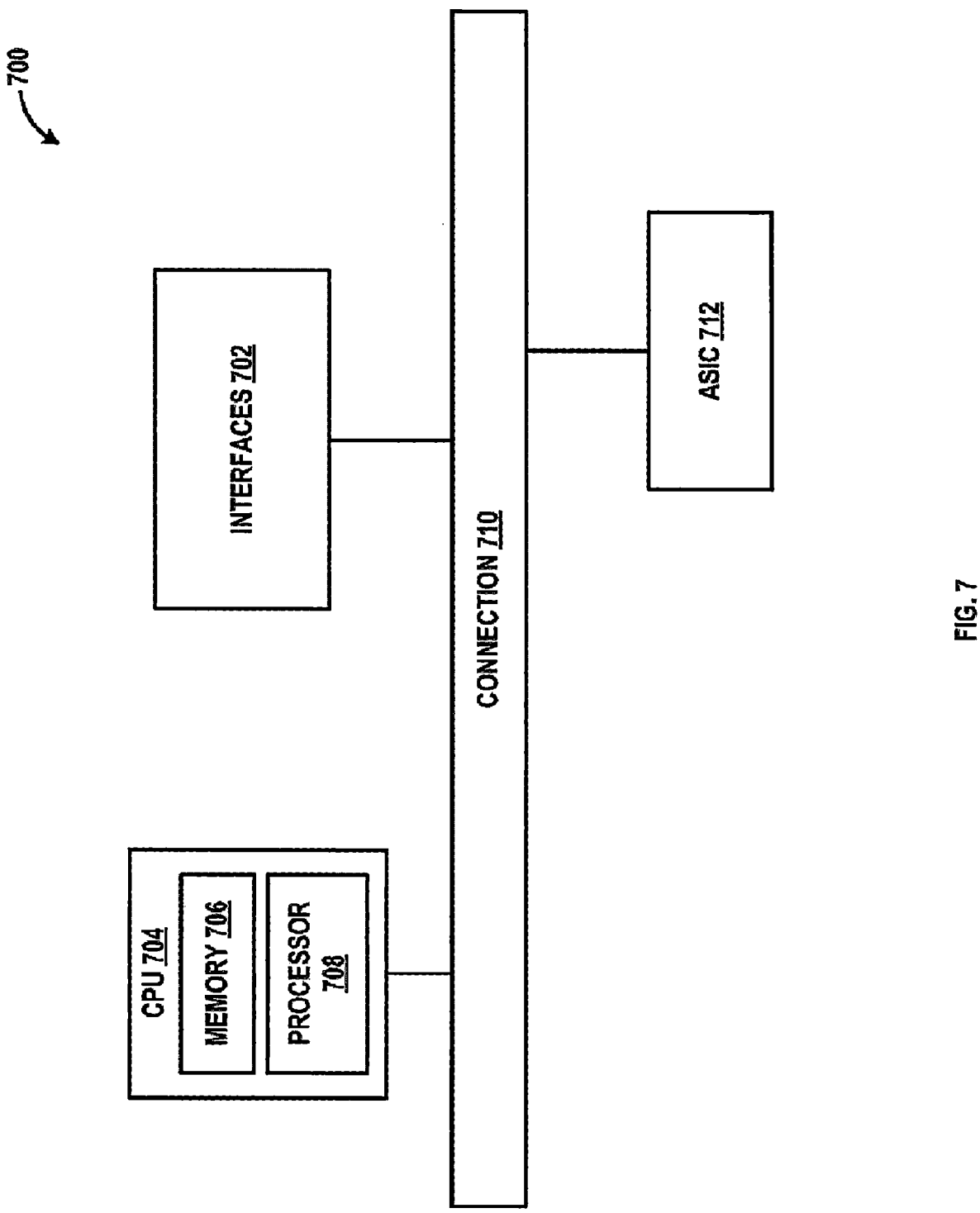
FIG. 7 illustrates an example of a network device according to some aspects of the present disclosure.

FIG. 7 illustrates an example network device 700 suitable for performing switching, routing, load balancing, and other networking operations. The example network device 700 can be implemented as switches, routers, nodes, metadata servers, load balancers, client devices, and so forth. The example network device 700 can be, for example, any computing device making up source device 142A, destination device 142B, intermediate device 142C, controller 132, or any component thereof in which the components of the system are in communication with each other.

Network device 700 includes a central processing unit (CPU) 704, interfaces 702, and a bus 710 (e.g., a PCI bus). When acting under the control of appropriate software or firmware, the CPU 704 is responsible for executing packet management, error detection, and/or routing functions. The CPU 704 preferably accomplishes all these functions under the control of software including an operating system and any appropriate applications software. CPU 704 may include one or more processors 708, such as a processor from the INTEL X86 family of microprocessors. In some cases, processor 708 can be specially designed hardware for controlling the operations of network device 700. In some cases, a memory 706 (e.g., non-volatile RAM, ROM, etc.) also forms part of CPU 704. However, there are many different ways in which memory could be coupled to the system.

The interfaces 702 are typically provided as modular interface cards (sometimes referred to as "line cards"). Generally, they control the sending and receiving of data packets over the network and sometimes support other peripherals used with the network device 700. Among the interfaces that may be provided are Ethernet interfaces, frame relay interfaces, cable interfaces, DSL interfaces, token ring interfaces, and the like. In addition, various very high-speed interfaces may be provided such as fast token ring interfaces, wireless interfaces, Ethernet interfaces, Gigabit Ethernet interfaces, ATM interfaces, HSSI interfaces, POS interfaces, FDDI interfaces, WIFI interfaces, 3G/4G/5G cellular interfaces, CAN BUS, LoRA, and the like. Generally, these interfaces may include ports appropriate for communication with the appropriate media. In some cases, they may also include an independent processor and, in some instances, volatile RAM. The independent processors may control such communications intensive tasks as packet switching, media control, signal processing, crypto processing, and management. By providing separate processors for the communication intensive tasks, these interfaces allow the master CPU (e.g., 704) to efficiently perform routing computations, network diagnostics, security functions, etc.

Although the system shown in FIG. 7 is one specific network device of the present disclosure, it is by no means the only network device architecture on which the present disclosure can be implemented. For example, an architecture having a single processor that handles communications as well as routing computations, etc., is often used. Further, other types of interfaces and media could also be used with the network device 700.

Regardless of the network device's configuration, it may employ one or more memories or memory modules (including memory 706) configured to store program instructions for the general-purpose network operations and mechanisms for roaming, route optimization and routing functions described herein. The program instructions may control the operation of an operating system and/or one or more applications, for example. The memory or memories may also be configured to store tables such as mobility binding, registration, and association tables, etc. Memory 706 could also hold various software containers and virtualized execution environments and data.

The network device 700 can also include an application-specific integrated circuit (ASIC) 712, which can be configured to perform routing and/or switching operations. The ASIC 712 can communicate with other components in the network device 700 via the bus 710, to exchange data and signals and coordinate various types of operations by the network device 700, such as routing, switching, and/or data storage operations, for example.

For clarity of explanation, in some instances the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program, or a collection of programs that carry out a specific function. In some embodiments, a service can be considered a server. The memory can be a non-transitory computer-readable medium.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, solid state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

What is claimed is:

1. A method, comprising:

encrypting, at a source device of a network and using a destination encryption key, a payload of a packet destined for transmission to a destination device of the network, the destination device being uniquely associated with the destination encryption key and a destination device identifier;

encapsulating, at the source device and using an intermediate authentication header key uniquely associated with an intermediate device of the network, the payload, the destination device identifier and metadata within an intermediate authentication header of the packet, the metadata indicating a class of traffic associated with the packet; and transmitting, by a network interface of the source device and over the network, the packet having the intermediate authentication header to the intermediate device.

2. The method of claim 1, further comprising:

accessing, at the source device, destination information received from a controller of the network, the destination information including the destination device identifier and the destination encryption key of the destination device.

3. The method of claim 1, further comprising:

accessing, at the source device, intermediate authentication header information received from a controller of the network, the intermediate authentication header information including an intermediate network address and the intermediate authentication header key uniquely associated with the intermediate device; and adding, at the source device, routing information to the packet external to the intermediate authentication header, the routing information indicating the intermediate network address of the intermediate device.

4. The method of claim 1, the intermediate device of the network being operable for:

decapsulating, at the intermediate device and using the intermediate authentication header key, the intermediate authentication header of the packet;

accessing, at the intermediate device, destination authentication header information received from a controller of the network that includes a destination network address and a destination authentication header key uniquely associated with the destination device;

encapsulating, at the intermediate device and using the destination authentication header key, the payload, the destination device identifier, and the metadata within a destination authentication header; and transmitting, by a network interface of the intermediate device and over the network, the packet with the destination authentication header to the destination device based on the destination network address of the destination device.

5. The method of claim 4, the intermediate device of the network being operable for:

accessing, at the intermediate device, policy information associated with the packet based on the metadata for transmission of the packet to the destination device in accordance with the policy information.

6. The method of claim 4, the destination device of the network being operable for:

decrypting, at the destination device, the packet using the destination encryption key.

7. The method of claim 6, the destination device identifier and the metadata being encapsulated within the destination authentication header and the destination device of the network being operable for:

decapsulating, at the destination device and using a destination authentication header key uniquely associated with the destination device, the destination authentication header of the packet.

8. The method of claim 1, the source device being operable for encrypting the payload using an Internet Protocol Security (IPsec) Encapsulating Security Payload (ESP) protocol.

9. The method of claim 1, the source device being operable for encapsulating the intermediate authentication header using an Internet Protocol Security (Ipsec) Authentication Header (AH) protocol.

10. The method of claim 1, the destination device identifier being a hash.

11. A method, comprising:

decapsulating, at an intermediate device of a network and using an intermediate authentication header key uniquely associated with the intermediate device, an intermediate authentication header of a packet received from a source device of the network for transmission to a destination device of the network;

identifying, at the intermediate device, the destination device of the network;

encapsulating, at the intermediate device and using a destination authentication header key uniquely associated with the destination device, a payload of the packet within a destination authentication header; and transmitting, by a network interface of the intermediate device and over the network, the packet with the destination authentication header to the destination device based on a destination network address of the destination device.

12. The method of claim 11, further comprising:

accessing, at the intermediate device and following decapsulation of the intermediate authentication header, a destination device identifier that is uniquely associated with the destination device; and accessing, at the intermediate device, information received from a controller of the network that includes the destination network address and the destination authentication header key uniquely associated with the destination device.

13. The method of claim 11, further comprising:

accessing, at the intermediate device, metadata of the packet indicating a class of traffic associated with the packet; and accessing, at the intermediate device, policy information associated with the packet based on the metadata for transmission of the packet to the destination device in accordance with the policy information.

14. The method of claim 11, the destination authentication header encapsulating the payload of the packet, a destination device identifier, and metadata of the packet;

the payload being encrypted by a source device in communication with the intermediate device using a destination encryption key uniquely associated with the destination device;

the metadata indicating a class of traffic associated with the packet; and the destination device identifier being uniquely associated with the destination device.

15. The method of claim 11, further comprising:

adding, at the intermediate device, routing information to the packet following encapsulation of the packet within the destination authentication header, the routing information indicating the destination network address of the destination device.

16. The method of claim 11, the destination device of the network being operable for:

decrypting, at the destination device, the packet using a destination encryption key uniquely associated with the destination device.

17. The method of claim 16, the destination device of the network being operable for:

decapsulating, at the destination device and prior to decryption of the packet, the destination authentication header of the packet using a destination authentication header key uniquely associated with the destination device.

18. The method of claim 16, the destination device being operable for decrypting the payload using an Internet Protocol Security (IPsec) Encapsulating Security Payload (ESP) protocol.

19. The method of claim 11, the intermediate device being operable for encapsulating the destination authentication header using an Internet Protocol Security (IPsec) Authentication Header (AH) protocol.

20. A system, comprising:

a processor in communication with a memory and a network interface, the memory including instructions executable by the processor to:

encrypt, using a destination encryption key, a payload of a packet destined for transmission to a destination device of a network, the destination device being uniquely associated with the destination encryption key and a destination device identifier;

encapsulate, using an intermediate authentication header key uniquely associated with an intermediate device of the network, the payload, the destination device identifier and metadata within an intermediate authentication header of the packet, the metadata indicating a class of traffic associated with the packet; and transmit, by the network interface and over the network, the packet having the intermediate authentication header to the intermediate device.

\* \* \* \* \*